United States Patent [19]

Mix

[11] Patent Number: 4,600,544
[45] Date of Patent: Jul. 15, 1986

[54] PACKING UNIT AND METHOD OF MAKING

[75] Inventor: Thomas W. Mix, Wellesley, Mass.

[73] Assignee: Merix Corporation, Wellesley, Mass.

[21] Appl. No.: 553,949

[22] Filed: Nov. 23, 1983

Related U.S. Application Data

[63] Continuation-in-part of Ser. No. 445,201, Nov. 29, 1982, abandoned.

[51] Int. Cl.[4] ................................................ B01F 3/04
[52] U.S. Cl. ................................. 261/79 A; 29/157 R; 55/233; 202/158; 261/94; 261/DIG. 72; 366/337; 422/211
[58] Field of Search ................................ 261/94–98, 261/79 A, 112, DIG. 72; 366/336–338; 202/158; 210/150, 151; 55/90–92, 233; 29/157 R, 163.5 R; 422/211

[56] References Cited

U.S. PATENT DOCUMENTS

| | | | |
|---|---|---|---|
| 1,887,704 | 11/1932 | Wilisch | 261/94 |
| 3,051,453 | 8/1962 | Sluijters | 366/337 |
| 3,266,787 | 8/1966 | Eckert | 261/94 |
| 3,589,687 | 6/1971 | Leybourne, III | 261/94 X |
| 3,618,910 | 11/1971 | Arndt | 261/94 |
| 3,620,506 | 11/1971 | So | 366/337 |
| 3,704,869 | 12/1972 | Priestley | 261/112 |
| 3,752,453 | 8/1973 | Doyne | 261/94 |
| 4,041,113 | 8/1977 | McKeown | 261/98 |
| 4,067,936 | 1/1978 | Ellis et al. | 261/98 |
| 4,179,222 | 12/1979 | Strom et al. | 366/337 |
| 4,195,043 | 3/1980 | Foote et al. | 55/90 X |
| 4,197,264 | 4/1980 | Degg | 261/98 |
| 4,203,934 | 5/1980 | Leva | 202/158 X |
| 4,203,935 | 5/1980 | Hackenjos | 261/98 |
| 4,277,425 | 7/1981 | Leva | 261/98 |
| 4,333,892 | 6/1982 | Ellis et al. | 261/DIG. 72 |
| 4,496,498 | 1/1985 | Pluss | 261/95 |

FOREIGN PATENT DOCUMENTS

| | | | |
|---|---|---|---|
| 2208226 | 9/1973 | Fed. Rep. of Germany | 366/338 |
| 2130621 | 11/1972 | France | 261/DIG. 72 |
| 1573745 | 8/1980 | United Kingdom | 261/DIG. 72 |

OTHER PUBLICATIONS

Van Winkle, *Distillation*, McGraw-Hill, Inc., New York, 1967, p. 606.

*Primary Examiner*—Richard L. Chiesa

[57] ABSTRACT

A packing unit having a set of deflectors within a cage for deflecting each of two fluids moving through the unit, the deflectors being arranged so that in any image of the unit formed by parallel rays projected onto a plane, regardless of how the unit is oriented with respect to the plane, at least half of the area enclosed by the perimeter of the image will be a shaded area, no more than 35% of the shaded area being produced by surfaces of said deflectors oriented at more than 60° to said rays.

18 Claims, 19 Drawing Figures

PACKING UNIT AND METHOD OF MAKING

BACKGROUND OF THE INVENTION

This application is a continuation-in-part of Mix, U.S. Ser. No. 445,201, filed Nov. 29, 1982, now abandoned.

This invention relates to packing units for enhancing contact between two fluids moving through such a unit.

Distilling towers (and washing columns and reaction chambers) may be loaded with randomly oriented packing units which have deflectors for breaking up the flow of two fluids in the tower (e.g., a gas rising and a liquid falling) to increase their contact with one another.

SUMMARY OF THE INVENTION

The invention features, in one aspect, such a unit having deflectors held within a cage and arranged so that in any image of the unit formed by parallel rays projected onto a plane, regardless of how the unit is oriented with respect to the plane, at least half of the area enclosed by the perimeter of the image will be a shaded area, no more than 35% of said shaded area being produced by surfaces of said deflectors oriented at more than 60° to said rays.

In preferred embodiments, the deflectors are arranged to cause each fluid to whirl when its path is within a predetermined angle of a reference axis of the cage; the deflectors are arranged at regular angular intervals around the axis in positions corresponding to a set of reference planes containing the axis, and all of the deflectors are oriented at the same angle between 30° and 60° (preferably 45°) with respect to their corresponding reference planes; the deflectors are arranged at equal intervals around a reference axis of the unit with the line of intersection of a plane normal to the axis with the plane of each deflector being perpendicular to a radius extended from the axis to the deflector; and the cage includes a pair of parallel cylindrical rings coaxial with and spaced apart along a reference axis of the unit.

In another aspect, the invention features such a unit having two sets of deflectors, said sets respectively being arranged to cause fluid whirling in a first direction and in the opposite direction from the first direction.

In some preferred embodiments, the two sets are located at different positions along an axis of the unit; there are two further sets of deflectors, each further set being located at a different radial position with respect to the axis than a corresponding one of the sets and arranged to cause fluid whirling in the opposite direction from the whirling caused by the corresponding set; and there are additional sets of deflectors located at different axial or radial positions from any of said sets, each additional set arranged to cause whirling either in the first direction or in the opposite direction.

In other preferred embodiments the two sets are located at different radial positions with respect to the axis of the unit; the whirling in the opposite direction substantially cancels the whirling in the first direction; there is a cylindrical cage centered on the axis and containing the deflectors, the cage having two parallel cylindrical rims coaxial with and spaced apart along the axis, the combined height of the rims being less than 35% of the height of the cage, and each deflector has a radial extent of between about ⅛ and about ¼ of the diameter of the cage; and the cage is a half-cylinder.

In other preferred embodiments, there is a support member for supporting the deflectors, the support member having a sequence of segments including support segments each connected to at least one deflector and spanning segments connecting successive support segments; the deflectors have edges oriented radially to the axis, and each support segment is connected to the radially oriented edge of at least one deflector; and the spanning segments include shorter segments positioned relatively closer to the axis and longer segments positioned relatively farther from the axis.

In another aspect, the invention features a method of making a packing unit having a plurality of fluid deflectors, including the steps of cutting a bendable sheet to define a row of tab areas connected to a supporting region of the sheet, bending the tab areas to project from the supporting region, bending each tab area, along a line substantially perpendicular to the supporting region, to form a pair of the deflectors, and wrapping the supporting region to define a space with the tab areas projecting into the space.

In preferred embodiments, there are additional steps of cutting each tab area to define two adjacent sub-tabs, and bending each sub-tab, along a line substantially perpendicular to the supporting region, to define a pair of deflectors, adjacent sub-tabs being bent in opposite directions.

In another aspect, the invention features a method of making a packing unit having a plurality of fluid deflectors including the steps of cutting a bendable sheet to define a row of formable areas arranged along one direction of the sheet and each connected to a supporting region of the sheet, bending the formable areas by imparting folds parallel to the one direction, and wrapping the supporting region to define a space with the formable areas projecting into the space.

In preferred embodiments, the supporting region includes a strip along the row, the strip having a supporting segment attached to at least one of the formable areas and a spanning segment attached to the supporting segment, and the wrapping step includes folding the strip so that the supporting segment is oriented radially to a reference axis of the unit and the spanning segment is oriented tangentially with respect to the reference axis.

The unit intercepts, radially disperses and mixes the fluids by providing a large interfacial contact area which is relatively uniform and evenly dispersed (regardless of the unit's orientation), a relatively low and uniform resistance to flow (regardless of the unit's orientation), no net swirl flow, a high fraction wetted area, and a high ratio of sheer drag to form drag, while allowing passage of a relatively high volume of fluids per time; and the unit is easily and economically fabricated, is self-supporting, and is not subject to nesting when randomly dumped.

Other features and advantages will be apparent from the following description of the preferred embodiments and from the claims.

DESCRIPTION OF THE PREFERRED EMBODIMENTS

We first briefly describe the drawings.

Drawings

Structure

Figure 1:
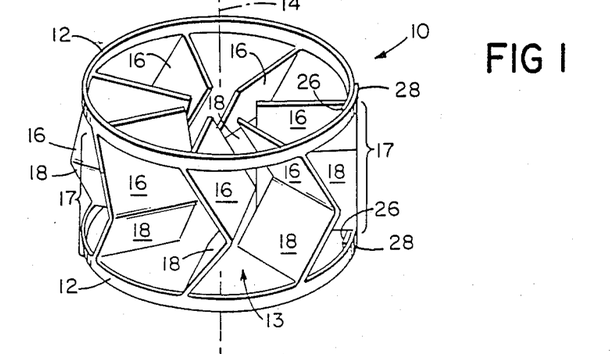
FIG. 1 is an isometric view of a preferred embodiment of a packing unit.

Referring to FIG. 1, packing unit 10 has two round, parallel rims 12 ($\frac{1}{8}$" wide, $1\frac{5}{8}$" diameter, 1" apart, and both centered on axis 14), enclosing cylindrical space 13. Seven identical rectangular metal elements 17, each folded in half to define a pair of flat, rectangular deflectors 16, 18 (at approximately right angles to each other), are supported by the two rims and project into the cylindrical space. The seven metal elements 17 are spaced at equal angular intervals around the axis. Deflectors 16 are all oriented at a 45-degree angle to the axis, like the blades of a turbine. Deflectors 18 are similarly oriented at a 45-degree angle to the axis (but in the opposite direction as deflectors 16), also like the blades of a turbine. Each deflector 16, 18 is oriented radially between the axis and the rims.

In any image of the unit formed by projecting parallel rays onto a plane, regardless of the orientation of the unit with respect to the plane, more than half of the area enclosed by the perimeter of the image will be a shaded area, no more than 35% of said shaded area being produced by surfaces of said deflectors oriented at more than 60° to said rays.

The unit intercepts, radially disperses and mixes the fluids by providing a large interfacial contact area which is relatively uniform and evenly dispersed (regardless of the unit's orientation), a relatively low and uniform resistance to flow (regardless of the unit's orientation), no net swirl flow, a high fraction wetted area, and a high ratio of sheer drag to form drag, while allowing passage of a relatively high volume of fluids per time; and the unit is easily and economically fabricated and is not subject to nesting when randomly dumped.

Manufacture

Figure 2:
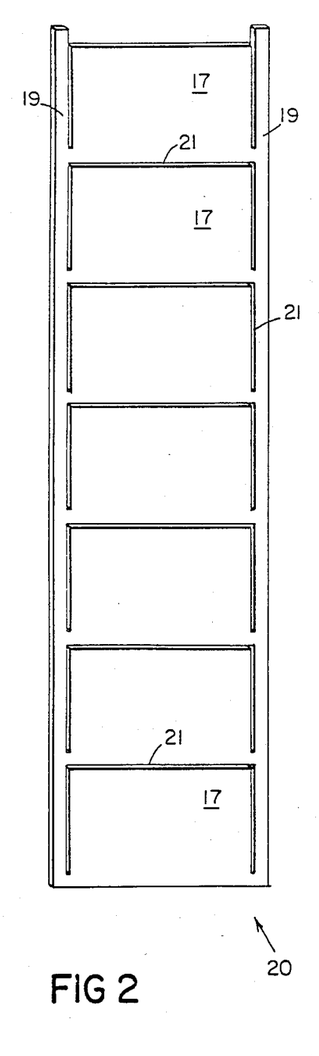
FIG. 2 is a plan view of the sheet from which the packing unit of FIG. 1 is fabricated.
Figure 3:
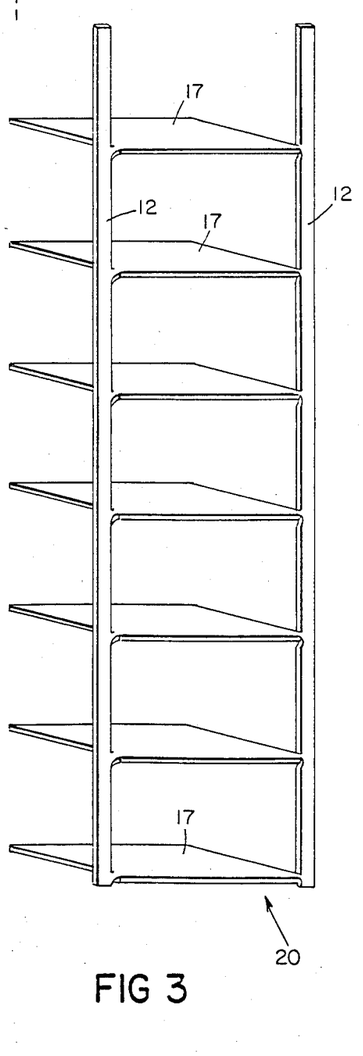
FIGS. 3 and 4 are isometric views of the sheet of FIG. 2 at two intermediate stages in the fabrication of the packing unit of FIG. 1.
Figure 4:
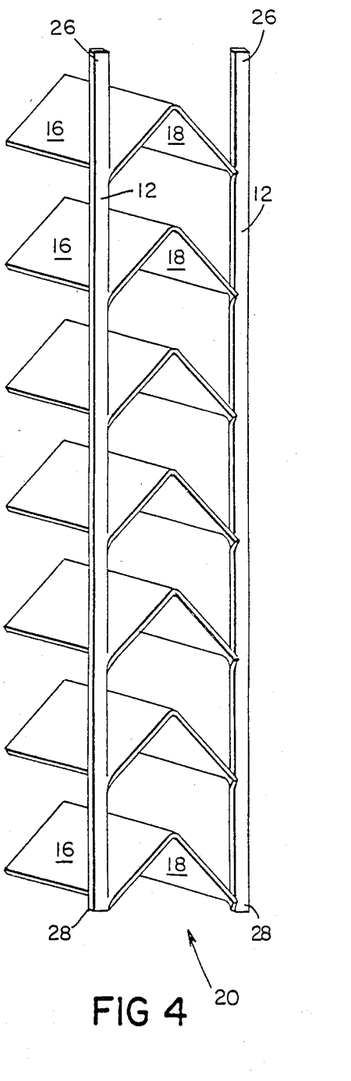

Referring to FIG. 2, fabrication begins with a rectangular sheet 20 of bendable metal, cut by seven u-shaped cuts 21, each u-shaped cut defining one of the metal elements 17. The metal elements are arranged in a row between two parallel strips 19 which will become rims 12. Referring to FIG. 3, each metal element 17 is folded to project at a right angle to the plane of the rest of the sheet. Referring to FIG. 4, each tab is then bent to form deflectors 16, 18. The resulting form is wrapped into a cylinder, with each strip 19 forming a rim 12 and the deflectors occupying cylindrical space 13. Rib tabs 26 are then welded to rim ends 28.

Operation

In use, a number of the packing units are dumped randomly into a packing tower where they promote contact between the two fluid streams. Any fluid stream approaching a packing unit in a direction which is no more than about 45 degrees off the axis of the unit will be forced to whirl by that set of deflectors (16 or 18) which is closer to the source of the fluid stream, and the whirling will then be reduced (e.g., to zero) by the other set of deflectors (16 or 18) which is farther from the fluid source. Regardless of the direction from which each fluid comes, less than 50% of the volume of each fluid can pass through the unit undiverted by the deflectors.

Other Embodiments

Figure 5:
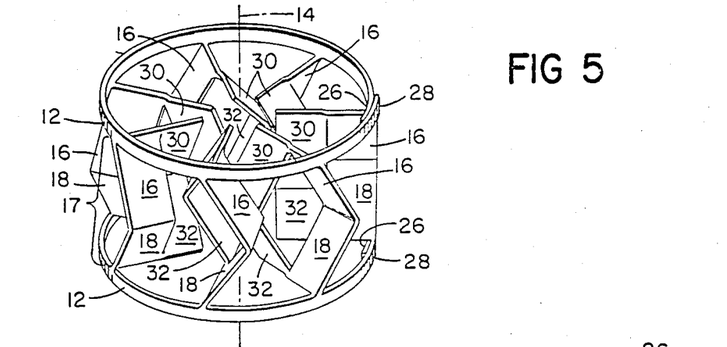
FIG. 5 is an isometric view of a second embodiment of a packing unit.
Figure 6:
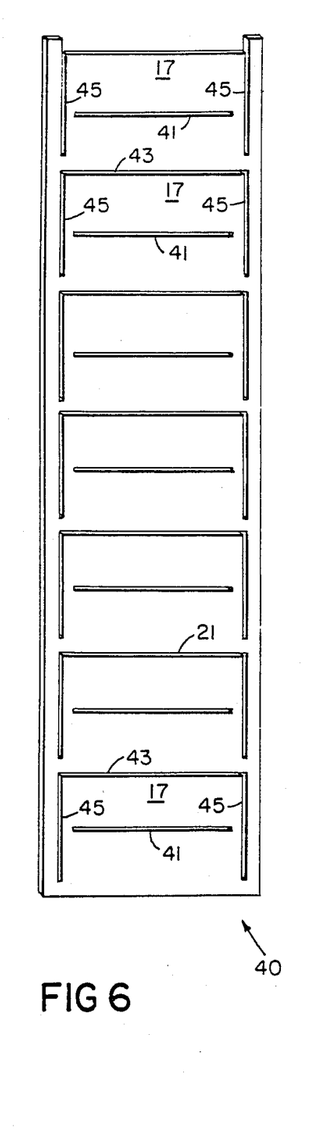
FIG. 6 is a plan view of the sheet from which the packing unit of FIG. 5 is fabricated.
Figures 7, 8:
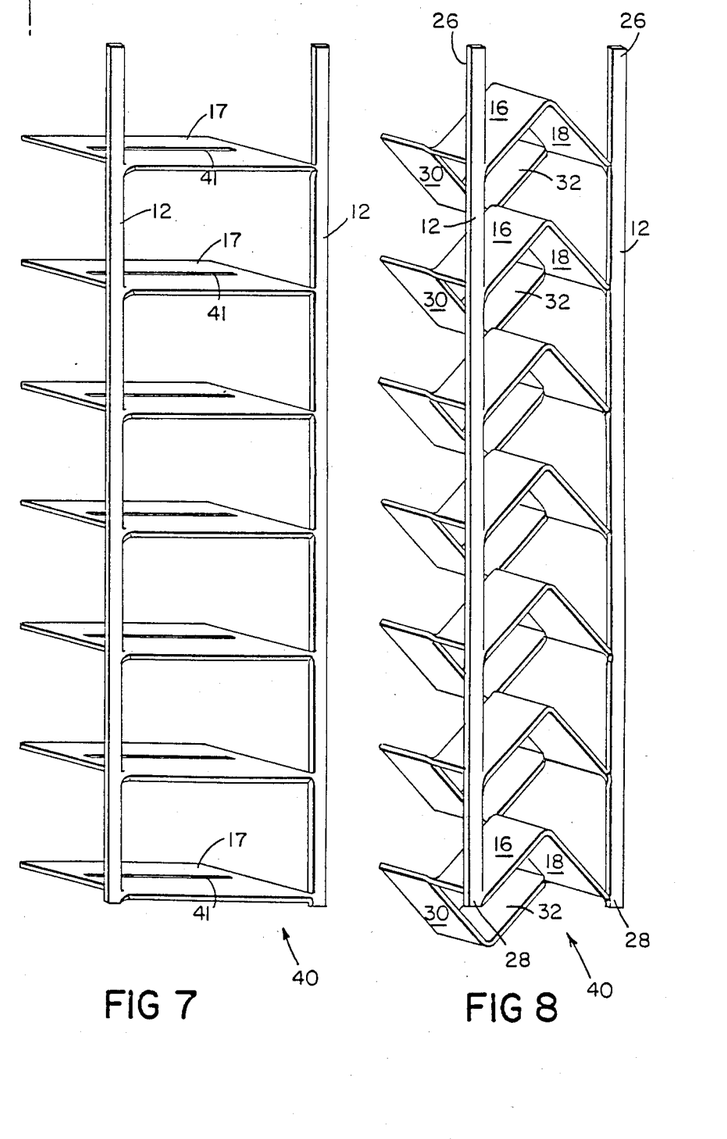
FIGS. 7 and 8 are isometric views of the sheet of FIG. 6 at two intermediate stages in the fabrication of the packing unit of FIG. 5.

Referring to FIG. 5, in a second embodiment, each of the seven metal elements 17 includes (in addition to deflectors 16, 18) deflectors 30, 32. Each deflector 30 is located radially closer to the axis than the corresponding deflector 16, and is oriented at a 45-degree angle (but in the opposite direction with respect to the axis) as the corresponding deflector 16. Similarly, each deflector 32 is located radially closer to the axis than the corresponding deflector 18 and is oriented at the same angle (but in the opposite direction with respect to the axis) as the corresponding deflector 18. Each deflector 30, 32 is generally oriented radially between the axis and the rims. Deflectors 30 cause whirling in the fluid in the opposite direction from the direction of whirling caused by deflectors 16, and deflectors 32 cause whirling in the opposite direction from deflectors 18. Each deflector 16, 18, 30, 32 has a radial extent of between about $\frac{1}{8}$ and $\frac{1}{4}$ of the diameter of the unit. Referring to FIGS. 6, 7 and 8, the embodiment of FIG. 5 is fabricated similarly to the embodiment of FIG. 1. In sheet 40, each metal element 17 is cut by a slit 41 which is parallel to the mid-segment 43 of each u-shaped cut 21, but does not extend as far as either end-segment 45 of each u-shaped cut 21. Metal elements 17 are folded to project at right angles to the plane of the rest of sheet 40. Deflectors 16, 18, 30, 32 are formed by folding the two halves of metal element 17 in opposite directions and the resulting form is wrapped into a cylinder and welded.

Figure 9:
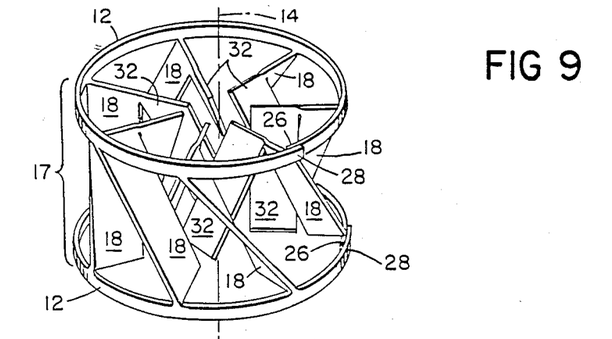
FIG. 9 is an isometric view of a third embodiment of a packing unit.
Figure 10:
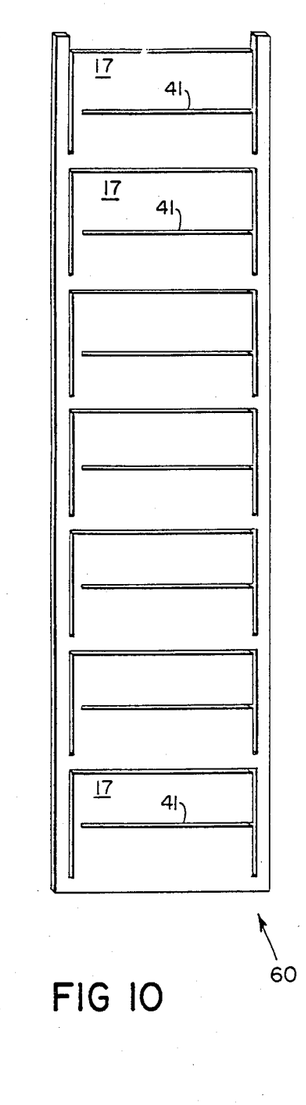
FIG. 10 is a plan view of the sheet from which the packing unit of FIG. 9 is fabricated.
Figure 11:
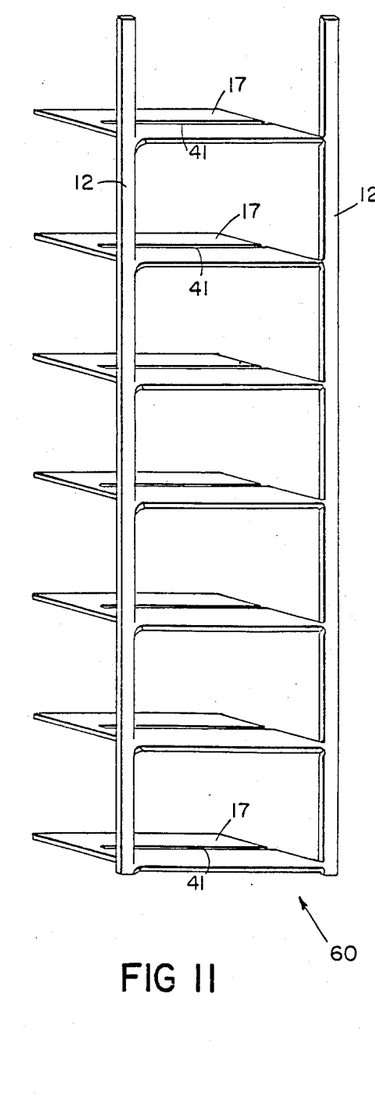
FIGS. 11 and 12 are isometric views of the sheet of FIG. 10 at two intermediate stages in the fabrication of the packing unit of FIG. 9.
Figure 12:
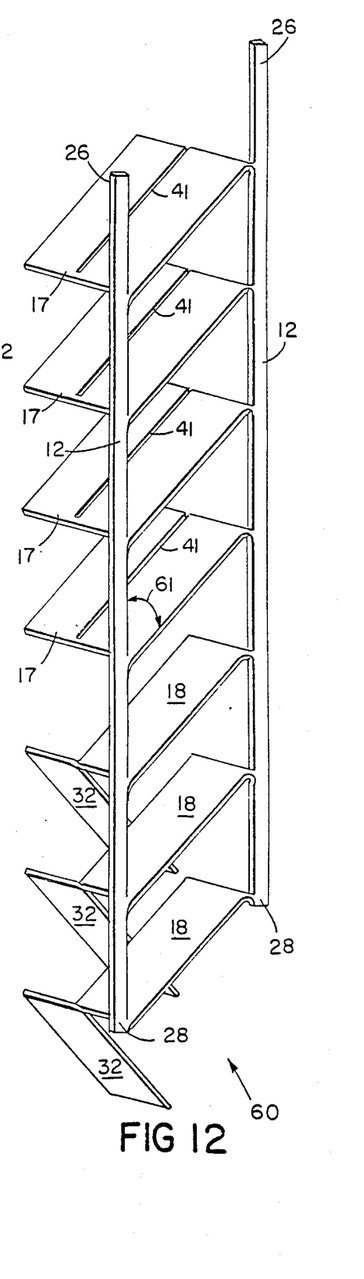

Referring to FIG. 9, a third embodiment is similar to the second embodiment but has only deflectors 18, 32 (deflectors 16 and 30 being eliminated); and each deflector 18, 32 spans the space between the two rims 12. Referring to FIGS. 10, 11, and 12, the embodiment of FIG. 9 is fabricated similarly to the embodiment of FIG. 5, except that each slit 41 extends through to one of the end-segments 45 of u-shaped cut 21. After sheet 60 is cut, metal elements 17 are bent perpendicularly to the plane of the sheet; sheet 60 is bent so that the rims 12 shift along their respective lengths, but in opposite directions (leaving the line of folding between each element 17 and sheet 60 at an angle (61 in FIG. 12) of 45 degrees to the length of each rim); each deflector 32 is bent at a 90-degree angle to its corresponding deflector 18 (FIG. 12 shows only some of the deflectors 32 so bent); and the resulting form is wrapped into a cylinder and welded.

Figures 13, 15:
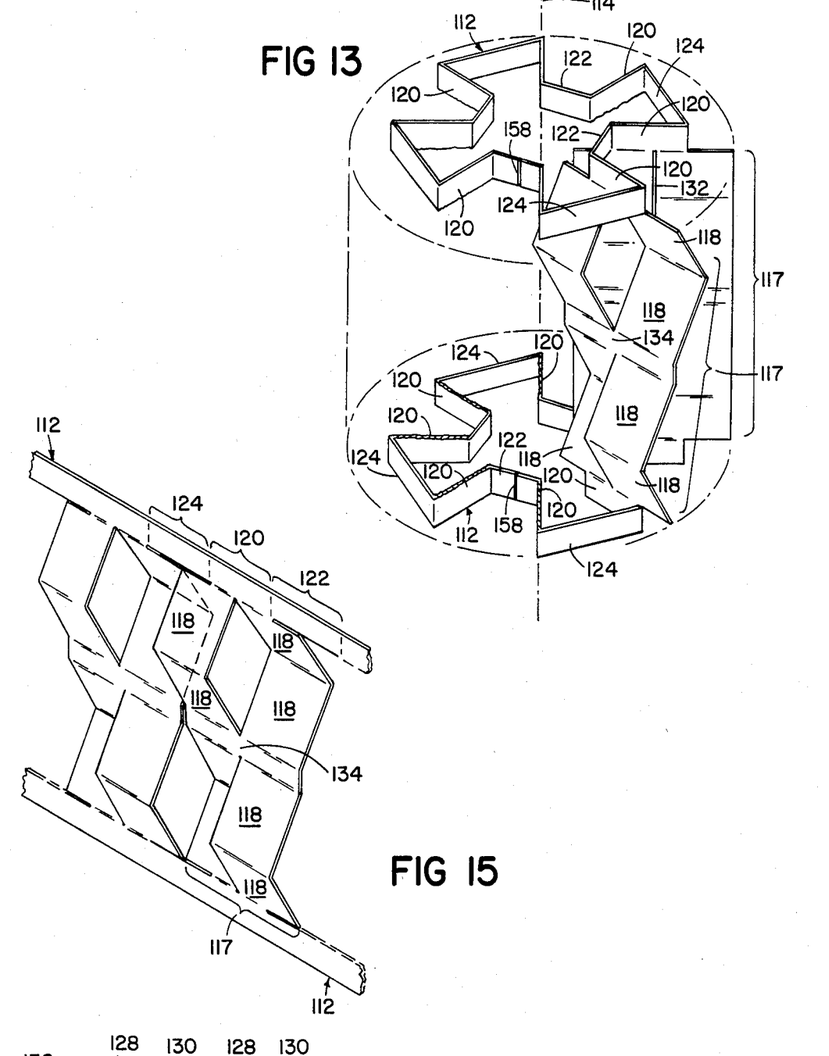
FIG. 13 is an isometric view, partially broken away, of a fourth embodiment of a packing unit.
FIGS. 15 and 16 are isometric views, partially broken away, of two intermediate stages in the fabrication of the packing unit of FIG. 13.

Referring to FIG. 13, a fourth embodiment has eight identical metal elements 117 (only two of which are shown) arranged at equal intervals around axis 114. Each metal element is folded to define eight flat rectangular deflectors 118. The metal elements 117 are together supported by two bent metal end supports 112. Each end support has a series of sixteen segments, including eight attached segments 120 (each attached to either the upper or lower edge of one of the metal elements 117), four shorter spanning segments 122 (which span between adjacent metal elements at a location near the axis 114), and four longer spanning segments 124 (which span between adjacent metal elements at a location farther from the axis 114). End supports 112 thus hold metal elements 117 in position about the axis 114.

Figure 14:
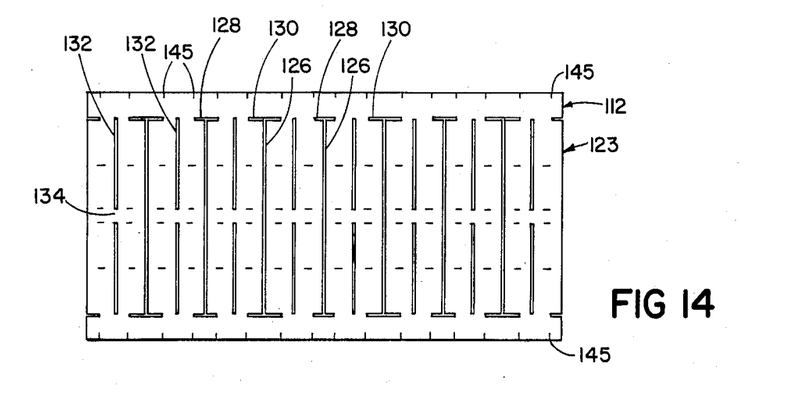
FIG. 14 is a plan view of the sheet from which the packing unit of FIG. 13 is fabricated.
Figure 16:
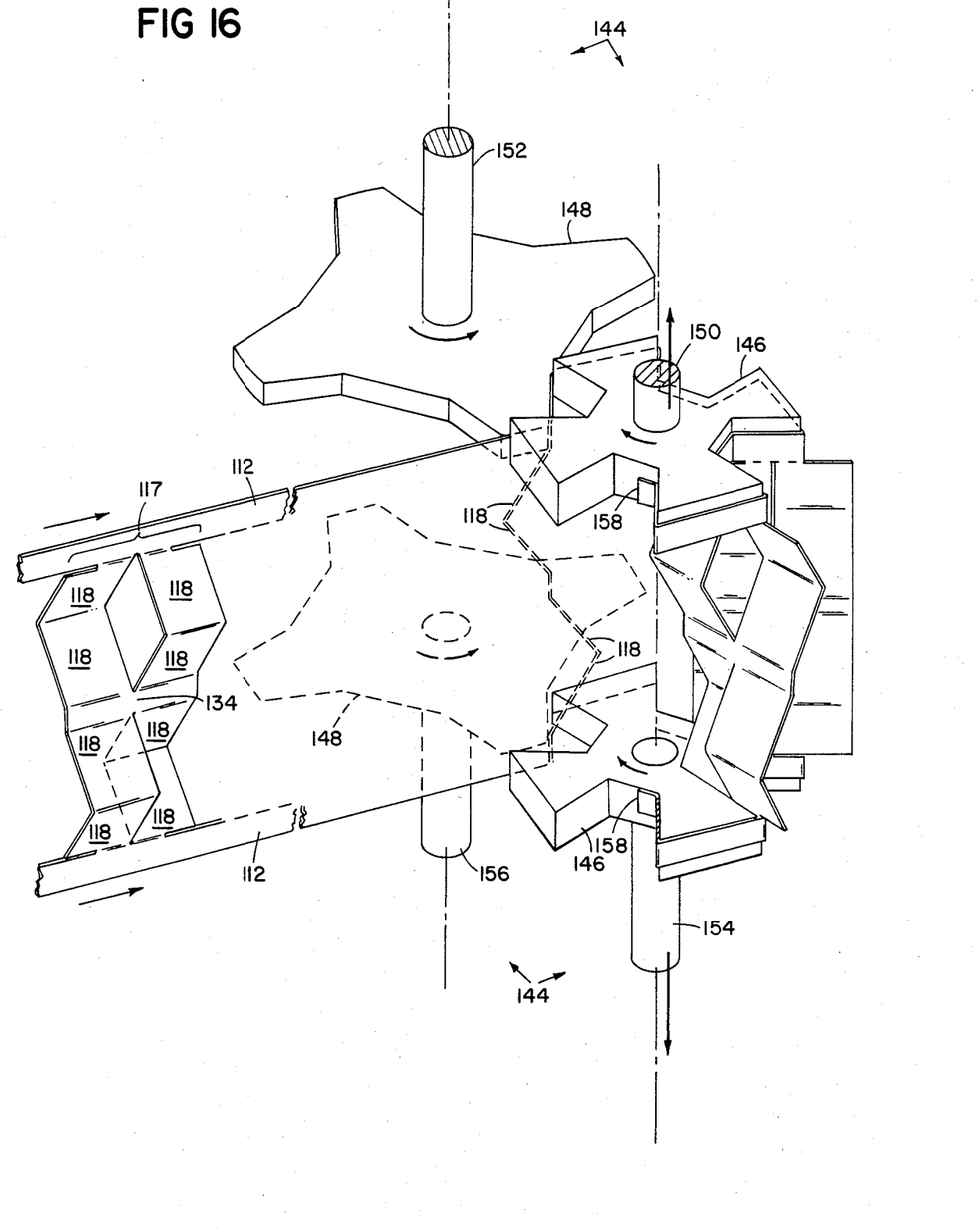

Referring to FIGS. 14, 15, 16, the embodiment of FIG. 13 is fabricated from a rectangular sheet metal blank 123, cut by seven equally-spaced I-shaped cuts 126 alternate ones of which have shorter end cuts 128, and intervening ones of which have longer end cuts 130. Between the I-shaped cuts are straight cuts 132, each interrupted by a shorter uncut section 134. Referring to FIG. 15, blank 123 is bent by rolling it sideways through an appropriate pair of gears to form deflectors 118. The bend lines are shown by dashed lines in FIG. 14. Referring to FIG. 16, blank 123 is then fed lengthwise into a forming device including two pairs 144 of mating gears. Each pair 144 includes a female gear 146 and a male gear 148 mounted respectively on parallel rotatable shafts 150, 152, 154, 156. End supports 112 are fed between the mating surfaces of each pair 144. As the male and female gears of each pair 144 are rotated in opposite directions the corners of their respective mating surfaces cause supports 112 to be bent into their final configurations with elements 117 supported between them in their final positions. The feeding of blank 123 and the rotation of gear pairs 144 is coordinated so that the folds in supports 112 are made at the proper locations (indicated by the marks 145 in FIG. 14). When the unit is completely formed, the ends of supports 112 will meet at points 158 to form shorter spanning segments 122. The gears 146 are then withdrawn axially leaving the finished unit.

Figures 17, 19:
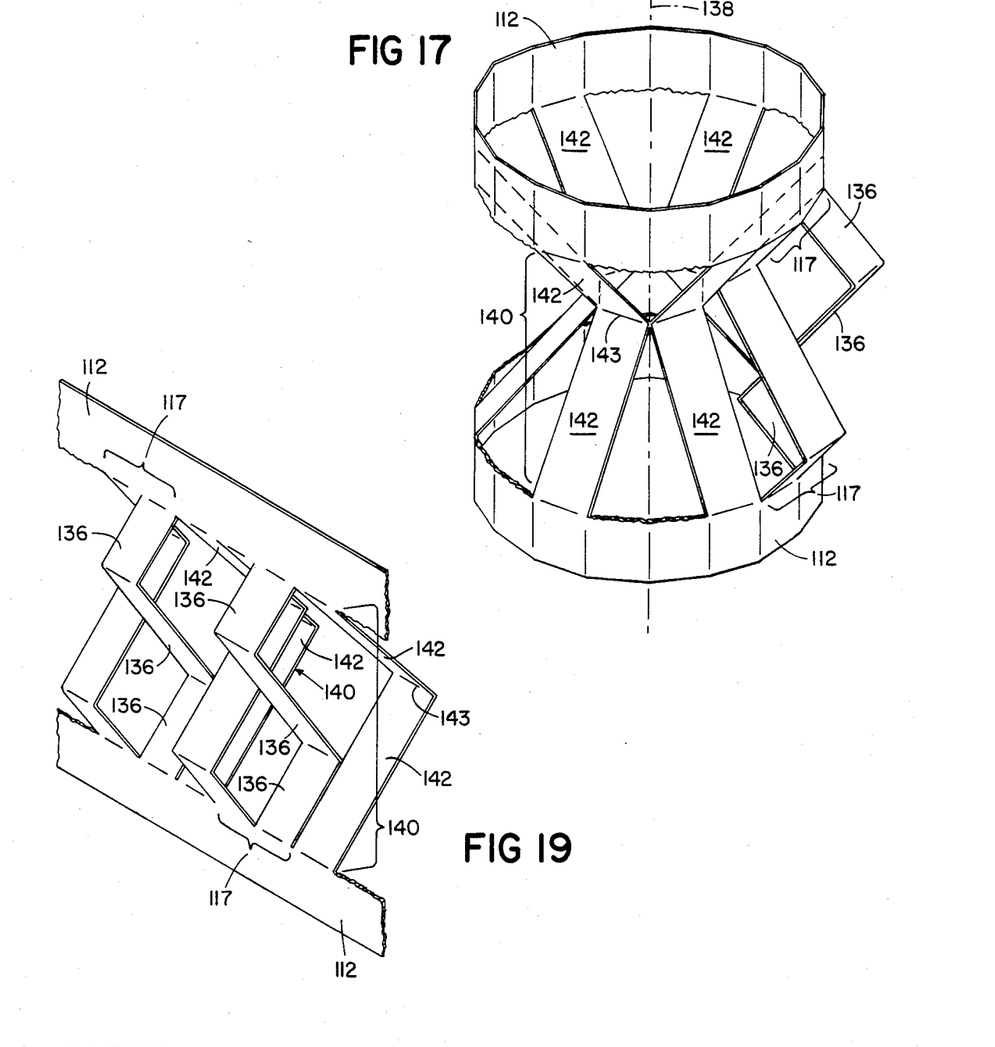
FIG. 17 is an isometric view, partially broken away, of a fifth embodiment of a packing unit.
FIG. 19 is an isometric view, partially broken away, of an intermediate stage in the fabrication of the packing unit of FIG. 17.

Referring to FIG. 17, a fifth embodiment has six pairs of metal elements 117 (of which one pair is shown). Each metal element is bent to form three flat rectangular deflectors 136, each deflector being oriented so that the lines of intersection of a plane normal to axis 138 with the planes of the deflectors are perpendicular to radii extended from the axis to the lines of intersection. The six pairs of metal elements 117 are arranged at equal intervals around axis 138 by rims 112. Six additional metal elements 140 are arranged at equal intervals around axis 138, each additional element 140 being bent to form a pair of additional deflectors 142 arranged so that the lines of bending 143 all approximately meet at the midpoint of axis 138.

Figure 18:
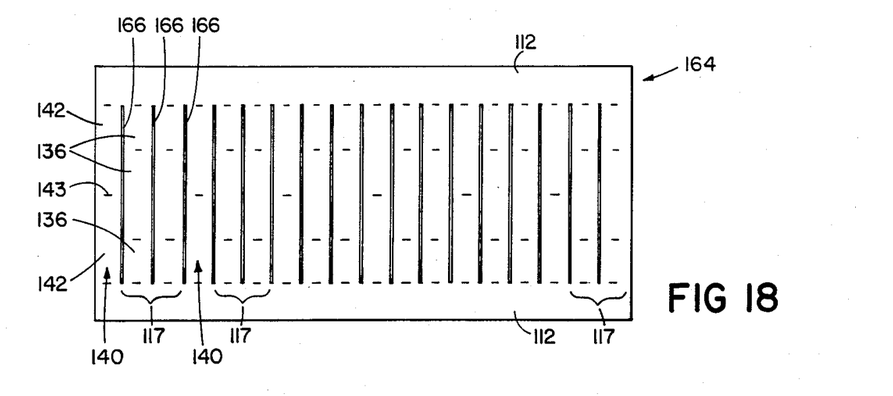
FIG. 18 is a plan view of the sheet from which the packing unit of FIG. 17 is fabricated.

Referring to FIGS. 18, 19, the embodiment of FIG. 17 is fabricated from a rectangular sheet 164 having seventeen equal length, equally spaced cuts 166 which define the metal elements 117 and additional elements 140. Referring to FIG. 19 the sheet is then bent (along bend lines shown in FIG. 18) to form the elements 117, 140. Finally, the bent blank is rolled to form the finished unit of FIG. 17.

The second through sixth embodiments operate similarly to the first embodiment, except that the sixth embodiment does not produce substantial swirling.

Other Embodiments

Other embodiments are within the following claims. E.g., additional sets of deflectors may be included at other axial or radial locations to cause whirling; more or less than seven deflectors can be in each set, the deflectors of each set being oriented like the blades of a turbine; the deflectors can be oriented at other angles to the axis (e.g., angles between 30 and 60 degrees); the height and diameter of the unit can be varied; the unit can comprise only a portion of a cylinder (e.g., a half cylinder); the rims of the cylinder can be curved both in one dimension to form the rim and in another dimension to reduce flow resistance; the number of different sets of deflectors in the embodiment of FIG. 13 could be reduced, for example, by cutting it in half across its axis; and a progressive die fabrication technique could be used for manufacture.

I claim:

1. A packing unit for enhancing contact between two fluids moving through said unit, comprising
   a cage, and
   a set of deflectors within said cage for deflecting at least one of the fluids, said deflectors being arranged so that in any image of said unit formed by parallel rays projected onto a plane, regardless of how said unit is oriented with respect to said plane, at least half of the area enclosed by the perimeter of said image will be a shaded area, no more than 35% of said shaded area being produced by surfaces of said deflectors and of said cage which are oriented at more than 60° to said rays.

2. The packing unit of claim 1 wherein said deflectors are oriented to cause each said fluid to whirl when its path is within a predetermined angle of a reference axis of said cage.

3. The apparatus of claim 1 comprising two sets of said deflectors, said sets respectively being arranged to cause fluid whirling in a first direction and in the opposite direction from said first direction, for fluids approaching the packing unit along at least some paths, the sets of deflectors being further arranged to dflect at least some fluid approaching the packing unit along any path.

4. The packing unit of claim 3 wherein said two sets are located at different positions along a reference axis of said unit.

5. The packing unit of claim 4 further comprising two further sets of deflectors each said further set being located at a different radial position with respect to said axis than a corresponding one of said sets and arranged to cause fluid whirling in the opposite direction from the whirling caused by the corresponding set.

6. The packing unit of claim 5 further comprising additional sets of deflectors located at different axial or radial positions from any of said sets, each said additional set arranged to cause whirling either in said first direction or in said opposite direction.

7. The packing unit of claim 3 wherein said two sets are located at different radial positions with respect to a reference axis of said unit.

8. The packing unit of claim 1, 2, 3, 4, 5, 6 or 7 wherein said deflectors in each said set are arranged at regular angular intervals around said axis in positions corresponding to a set of reference planes containing said axis, and all of said deflectors in a given said set are oriented at the same angle with respect to their corresponding reference planes.

9. The packing unit of claim 8 wherein said same angle is between 30° and 60° (preferably 45°).

10. The packing unit of claim 3, 5 or 6 wherein said whirling in said opposite direction substantially cancels said whirling in said first direction.

11. The packing unit of claim 1 wherein said deflectors are arranged at equal intervals around a reference axis of the unit with the line of intersection of a plane normal to the axis with the plane of each deflector being perpendicular to a radius extended from the axis to the deflector.

12. The packing unit of claim 1 wherein said deflectors are arranged around a reference axis of the unit and the cage comprises a pair of parallel cylindrical rims coaxial with and spaced apart along a reference axis of said unit.

13. The packing unit of claim 3 wherein said deflectors are arranged around a reference axis of said unit, and further comprising a support member for supporting said deflectors, said support member comprising a sequence of segments including support segments each connected to at least one deflector and spanning segments connecting successive support segments.

14. The packing unit of claim 13 wherein said deflectors have edges oriented radially to said axis, and each said support segment is connected to the radially oriented edge of at least one deflector.

15. The packing unit of claim 13 wherein said spanning segments include shorter segments positioned relatively closer to said axis and longer segments positioned relatively farther from said axis.

16. Apparatus for enhancing contact between two fluids moving through a reaction chamber, comprising a plurality of packing units randomly oriented in the chamber, each packing unit comprising two sets of deflectors, said sets respectively being arranged to cause fluid whirling in a first direction and in the opposite direction from said first direction, for fluids approaching the packing unit along at least some paths, the sets of deflectors being further arranged to deflect at least some fluid approaching the packing unit along any path, and further comprising a cylindrical cage centered on said axis and containing said deflectors, said cage having two parallel cylindrical rims coaxial with and spaced apart along said axis, the combined heights of said rims being less than 35% of the height of said cage, and wherein each said deflector has a radial extent of between about ⅛ and about ¼ of the diameter of said cage.

17. The packing unit of claim 16 wherein said cage comprises a half-cylinder.

18. A method of making a packing unit having a plurality of fluid deflectors comprising the steps of cutting a bendable sheet to define a row of rectilinear formable areas arranged along one direction of the sheet and each connected to a supporting region comprising a strip along said row, said strip having a supporting segment attached to at least one said formable area and a spanning segment attached to said supporting segment, and wrapping said supporting region in said direction to define a space with said formable areas projecting into said space and wherein said wrapping step comprises folding said strip so that said supporting segment is oriented radially to a reference axis of said unit and said spanning segment is oriented tangentially with respect to said reference axis.

* * * * *